(12) United States Patent
Nusbaumer et al.

(10) Patent No.: US 6,371,175 B1
(45) Date of Patent: *Apr. 16, 2002

(54) SAFETY CLOSURE FOR FILLING SYSTEM, REMOTE ACTUATOR THEREFOR AND METHODS OF MAKING THE SAME

(76) Inventors: Joseph M. Nusbaumer, 1602 Oak Ridge Ct., Nixa, MO (US) 65714; Ronald Woods, 5186 N. Farm Rd. 159, Springfield, MO (US) 65803

( * ) Notice: Subject to any disclaimer, the term of this patent is extended or adjusted under 35 U.S.C. 154(b) by 0 days.

This patent is subject to a terminal disclaimer.

(21) Appl. No.: 09/699,964

(22) Filed: Oct. 30, 2000

Related U.S. Application Data

(63) Continuation of application No. 09/382,897, filed on Aug. 25, 1999, now Pat. No. 6,152,199.

(51) Int. Cl.[7] .............................. B65B 1/04; B65B 3/00; B67C 3/00
(52) U.S. Cl. .................. 141/383; 141/59; 141/312; 141/363; 141/382; 141/392; 220/262; 220/264; 137/588; 137/590
(58) Field of Search ................ 141/59, 192, 198, 141/200, 206, 208, 218, 225, 311 R, 312, 346, 348–350, 363–366, 382, 383, 392; 137/587, 588, 590; 251/149.2, 149.3; 220/262, 264, 284

(56) References Cited

U.S. PATENT DOCUMENTS

| | | | |
|---|---|---|---|
| 3,911,977 A | 10/1975 | Berger | 141/348 |
| 3,938,564 A | 2/1976 | Jones | 141/352 |
| 4,441,553 A | 4/1984 | Snyder et al. | 141/59 |
| 4,526,216 A | 7/1985 | Lake, Jr. | 141/348 |

Primary Examiner—Timothy L. Maust
(74) Attorney, Agent, or Firm—Richard L. Marsh

(57) ABSTRACT

In a filling system for moving a supply of liquid through an automatic nozzle, a filling adaptor affixed to a fill pipe of the container for receiving the automatic nozzle has a safety closure at a discharge end thereof to reduce spillage of liquid from the container upon tipping of the container.

20 Claims, 4 Drawing Sheets

SAFETY CLOSURE FOR FILLING SYSTEM, REMOTE ACTUATOR THEREFOR AND METHODS OF MAKING THE SAME

This application is a continuation of Applicants' parent patent application Ser. No. 09/382,897 filed on Aug. 25, 1999, now U.S. Pat. No. 6,152,199.

BACKGROUND OF THE INVENTION

1. Field of the Invention

This invention relates to a safety closure for a filling system wherein the filling system comprises a container to be filled, an automatic filling nozzle for moving a supply of liquid through the nozzle into the container, the container having a fill pipe connected thereto with a filling nozzle adaptor affixed to the open end of the fill pipe. The safety closure closes and seals the discharge end of the adaptor upon removal of the filling nozzle.

2. Prior Art Statement

It is known to provide a filling system for moving a supply of liquid through an automatic nozzle into a container wherein the container has a fill pipe with an filling adaptor affixed to the open end thereof. For instance, see the U.S. Pat. No. 4,441,553 issued on Apr. 10, 1984, to Snyder, et al.

It is also known to provide a releasable coupling for connecting a fluid supply to a container to minimize spillage of fluid during coupling and uncoupling wherein the fluid flows around a bulbous nose during the filling operation. For instance, see the U.S. Pat. No. 3,938,564 issued Feb. 16, 1976 to Kendall Jones.

It is further known to provide an end structure for fixing to an end portion of a filler pipe of a tank for receiving a liquid distribution nozzle, the end portion comprising a tubular member having a flanged entrance end adapted to receive a filler cap, a valve member operative to close and open a constricted passage in the tubular member, the valve member yieldably biased open by the insertion of a "regulation" liquid distribution nozzle. For instance, see U.S. Pat. No. 3,911,977 issued on Oct. 14, 1975 to Jean-Marie Berger.

Finally, it is known to provide an insert for the top of a tank for receiving a nozzle spout, the insert having large opening for receiving a tank cap and a smaller throat opening for receiving the nozzle spout wherein a valve is adapted to engage the bottom of the throat when the nozzle spout is removed and is adapted to open the throat when the nozzle spout is inserted therein. A portion of the valve always remains in the discharge stream from the nozzle. For instance, see U.S. Pat. No. 4,526,216 issued on July 2, 1985 to Leo C. Lake, Jr.

SUMMARY OF THE INVENTION

In the prior art, filling systems either have a door through which the nozzle passes or has a door which at least partially remains in the liquid stream dispensed from the nozzle, this latter condition resulting in a reduced liquid flow rate. The reduced liquid flow rate may be sufficient to prevent an automatic filling nozzle from being set for automatic operation, thus defeating one purpose of the closure door. Therefore, it is an object of this invention to provide a filling system for moving a supply of liquid through an automatic nozzle for dispensing a supply of liquid into a container wherein the nozzle has a valve with an operating lever for opening the valve and a biasing means for biasing said valve against a seat in a closed position. The valve further has a vacuum responsive means with a trip means associated therewith for closing the valve in response to liquid rising in the container to an inlet port of a vacuum tube affixed to the container. The container also has a fill pipe connected thereto with a hollow adaptor for receiving a nozzle spout of said nozzle, the nozzle being releasably secured to the hollow adaptor at one end thereof. The adaptor has a quick release coupling for accepting a quick release connector of the nozzle. The nozzle spout has a liquid dispensing passage and an air removal passage, the air removal passage disposed through a wall of the spout and connected at one end to the vacuum responsive means. The hollow adaptor has first end removably attached to the fill pipe and the second end having a reduced diameter extending into fill pipe, the adaptor having a frusto-conical section between the first end and the second end, wherein a vacuum chamber is created between a discharge end of the nozzle spout and an inside surface of the frusto-conical section of the adaptor when the discharge end of the nozzle spout is inserted into the adaptor proximate the frusto-conical section with the discharge end terminating short of the inside surface to provide for a narrow space between the discharge end and the inside surface of the frusto-conical section, whereby the velocity of the liquid flowing from the discharge end creates a partial vacuum in the vacuum chamber thereby supplying vacuum to the vacuum responsive means. The improved adaptor has a safety closure at the second end to reduce spillage of liquid from the container upon tipping of the container.

It is another object of this invention to provide a filling system having a safety closure at a second end of an adaptor wherein the safety closure is biased against the second end of the adaptor.

It is still another object of this invention to provide a filling system having a safety closure that is biased against a seat disposed in the second end of the hollow adaptor.

It is yet another object of this invention to provide a filling system has a gasket carried therewith, the gasket biased against the seat upon closure of the safety closure.

Additionally, it is an object of this invention to provide a filling system wherein the seat in the discharge end of the adaptor is tapered and the safety closure has a corresponding tapered sealing surface disposed on a closure side thereof.

Still another object of this invention is to provide a filling system wherein the partial vacuum created in by the velocity of fluid flowing from the nozzle spout is uninhibited and the velocity and quantity of liquid flowing from the discharge end is unrestricted by the safety closure.

A further object of this invention to provide a filling system having a safety closure at a discharge end of a fill pipe adaptor wherein the safety closure is actuated to an open position by the discharge end of the nozzle spout.

Yet an additional object of this invention is to provide a safety closure for a fill pipe adaptor of a container to be filled, wherein the safety closure is moved to an open position by a means for operating disposed remote from the safety closure, the means for operating actuated by a discharge end of a filling nozzle inserted into the fill pipe adaptor.

Finally, it is an object of this invention to provide a filling system having a safety closure at a discharge end of a fill pipe adaptor wherein the safety closure is actuated to an open position by the discharge end of the nozzle spout and wherein the safety closure is actuated to the open position by remote means, the remote means actuated by the discharge end of the nozzle spout.

DESCRIPTION OF THE PREFERRED EMBODIMENTS

While the various features of this invention are hereinafter described and illustrated as a filling system having a safety closure associated therewith wherein the safety closure is biased to an open position by the discharge end of a filling nozzle inserted into a filling adaptor affixed to the container to be filled, it is to be understood that the various features of this invention can be used singly or in various combinations thereof for a safety closure for any filling system as can hereinafter be appreciated from a reading of the following description.

Figure 1:
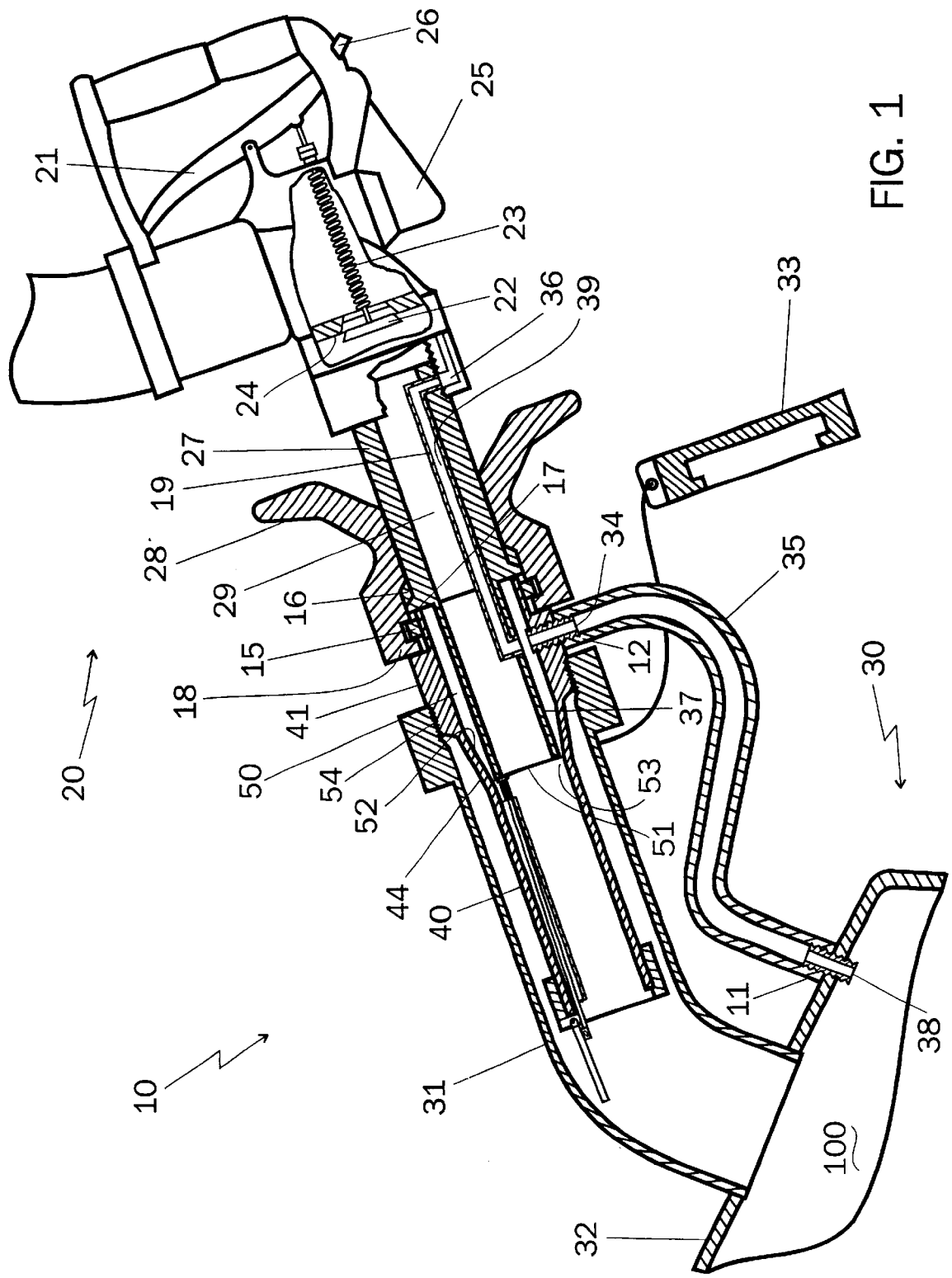
FIG. 1 is a partial section view of the filling system of this invention showing the preferred embodiment of the safety closure affixed to a filling adaptor removably attached to a fill pipe of a container.

Referring now to FIG. 1, in a filling system 10 for moving a supply of liquid through an automatic nozzle 20 for dispensing the supply of liquid into a container 30, nozzle 20 having a valve 22, valve 22 including an operating lever 21 for opening valve 22 and a biasing means 23 for biasing valve 22 against a seat 24 in a closed position. Valve 22 further has a vacuum responsive means 25 with a trip means 26 associated therewith for closing valve 22 in response to liquid 100 rising in container 30 to an inlet port 38 of a vacuum tube 35 affixed to container 30. A fill pipe 31 is connected to container 30 generally through a top 32 of container 30 and has a hollow adaptor 40 for receiving a nozzle spout 27 of nozzle 20, hollow adaptor 40 having a first end 41 and a second end 42 with a frusto-conical section 44 therebetween, first end 41 having means for removably attaching adaptor 40 to fill pipe 31 and second end 42 having a reduced diameter 43 extending into fill pipe 31. After removal of cap 33 from first end 41 of adaptor 40, nozzle 20 is releasably secured to hollow adaptor 40 at first end 41 with a quick release coupling 28 by a cam lock 18 thereof locked onto a locking ring 15, quick release coupling 28 having a seal 16 adapted for sealing nozzle spout 27 to open cap end 17 of adaptor 40. Nozzle spout 27 has a liquid dispensing passage 29 and an vacuum passage 39, vacuum passage 39 contained within a vacuum tube 19 disposed through a wall 37 of nozzle spout 27 and connected at one end 36 to vacuum responsive means 25 while liquid dispensing passage 29 provides for flow of liquid from valve 22 through discharge end 51. A vacuum chamber 50 is created between a discharge end 51 of nozzle spout 27 and an inside surface 52 of frusto-conical section 44 and first end 41 of adaptor 40 when discharge end 51 of nozzle spout 27 is inserted into adaptor 40 proximate frusto-conical section 44. Discharge end 51 terminates short of inside surface 52 to provide for a narrow space 53 between discharge end 51 and inside surface 52 of frusto-conical section 44, whereby the velocity of the liquid flowing from discharge end 51 creates a partial vacuum in vacuum chamber 50 thereby supplying vacuum to vacuum responsive means 25. According to the teachings of this invention, adaptor 40 has a safety closure 60 at second end 42 to reduce spillage of liquid from the container 30 upon tipping of the container 30.

Figure 2:
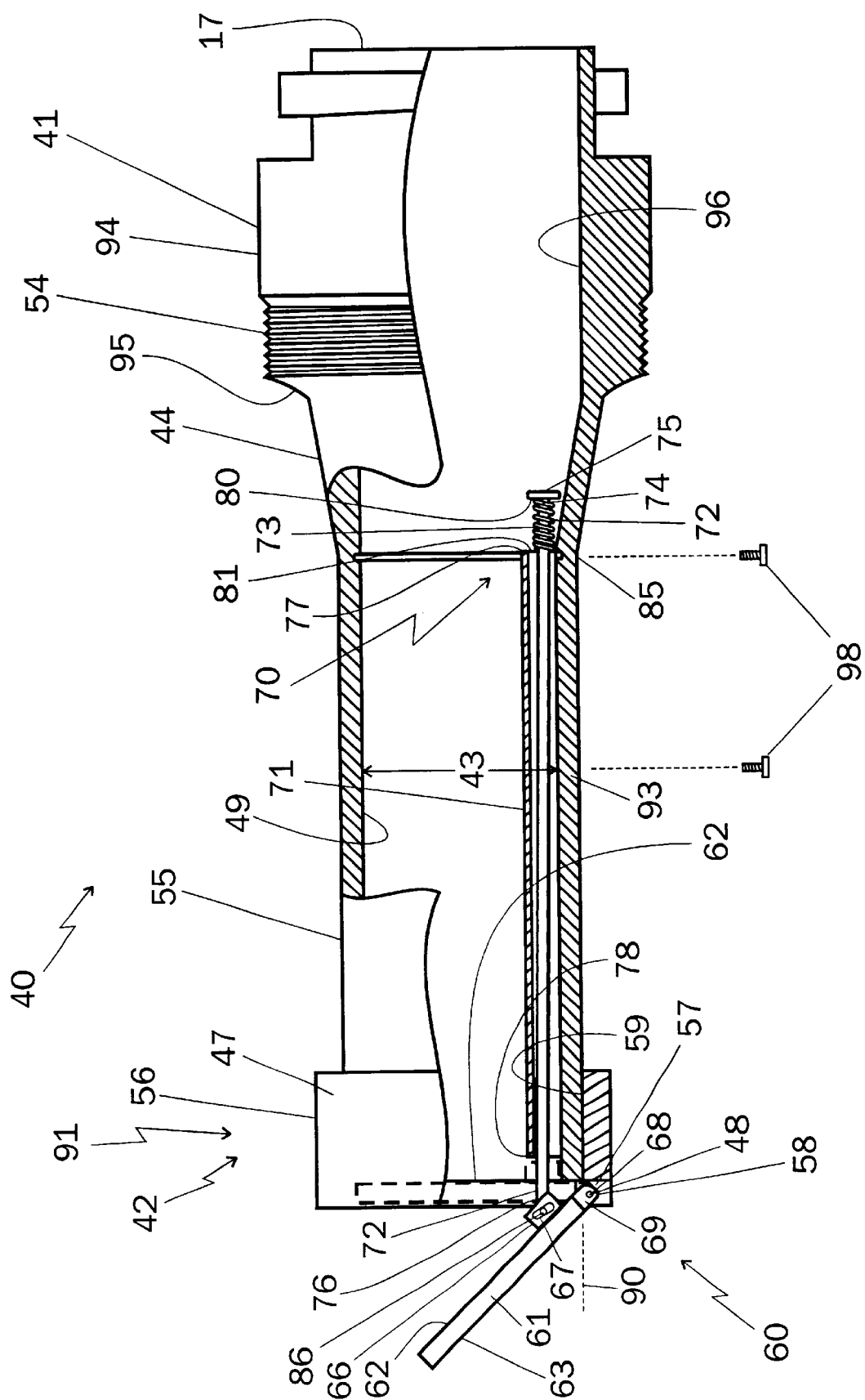
FIG. 2 is a partial section view of the preferred embodiment of the safety closure of FIG. 1 mounted upon an filling adaptor showing the safety closure in a partially open position in full view and in a fully closed position in phantom view.
Figure 3:
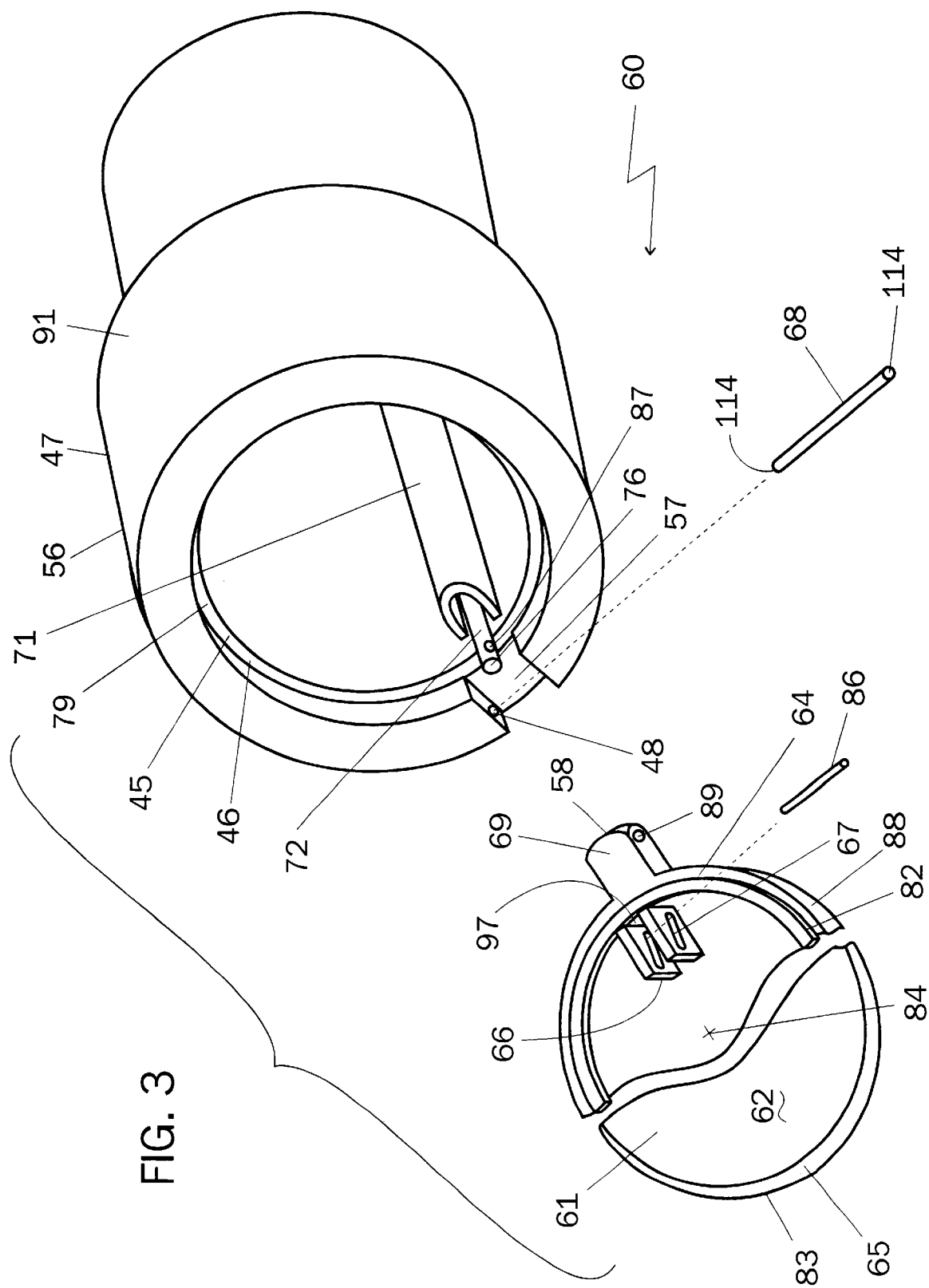
FIG. 3 is an enlarged exploded perspective view of the safety closure of this invention.

Referring now to FIGS. 2 and 3, safety closure 60 of filling system 10 comprises a closure lid 61, enlarged portion 91 on second end 42 of adaptor 40 and a means for operating 70 associated with second end 42 and closure lid 61. Closure lid 61 has a closure side 62 and an opposite side 63 and is pivotable about a hinge pin 68, hinge pin 68 disposed through a hinge arm 69 protruding from closure lid 61 and through a hinge pin hole 89 in enlarged portion 91. In the preferred embodiment, means for operating 70 comprises an actuating rod 72, a rod guide 71, a contact button 75, a biasing spring 73, at least one attachment boss 66 and a rod pin 86, however, means for operating 70 may merely comprise the force of fluid bearing against closure side 62 of closure lid 61 when a filling operation is commenced, closure lid 61 having a biasing spring disposed around hinge pin 68 biasing closure lid 61 against sealing surface 45. Preferably, closure lid 61 has closure side 62 biased against a sealing surface 45 on a terminal end 79 of second end 42 of adaptor 40 by biasing spring 73 on actuating rod 72 of means for operating 70. Actuating rod 72 is disposed through rod guide such as a guide tube 71 disposed on an inside surface 49 of adaptor 40, guide tube 71 extending at least a portion of the length of second end 42 and beginning approximately at the juncture 85 between frusto-conical section 44 and second end 42 and preferably extending from juncture 85 substantially to terminal end 79. Preferably, guide tube 71 is a closed tunnel integral with adaptor 40 but may be a separate tube or pipe affixed to inside surface 49 by suitable means or may be an internal snap ring 101, shown in FIG. 4, having a loop 102 at one end for receiving actuating rod 72 therein as will be hereinafter described. Contact button 75 is disposed on a nozzle end 74 of actuating rod 72 and preferably comprises a round disk affixed to nozzle end 74 and may alternately be made integral with actuating rod 72. Contact button 75 may also be any other shape provided contact button 75 may be contacted by discharge end 51 of nozzle spout 27 with minimum restriction of the flow of liquid from discharge end 51. Biasing spring 73 is preferably a helical compression spring which can be readily disposed around actuating rod 72 by sliding biasing spring 73 on actuating rod 72 from closure end 76 having one end 80 of biasing spring 73 bear against button 75. Upon assembly of safety closure 60, the other end 81 of biasing spring 73 bears against nozzle end 77 of guide tube 71. Closure end 76 of actuating rod 72 is affixed to attachment boss 66 with rod pin 86 disposed through rod pin slot 67 in attachment boss 66 and rod pin hole 87 in actuating rod 72. Thus, biasing spring 73 draws closure lid 61 toward sealing surface 45 when actuating rod 72 is attached to attachment boss 66 on closure side 62 of closure lid 61 as biasing spring 73 tends to expand and force button 75 away from nozzle end 77 of guide tube 71.

Enlarged portion 91 on second end 42 of adaptor 40 may comprise an encircling sleeve 47 adapted to slide over and frictionally engage outer peripheral surface 55 of adaptor 40 or, as preferred, enlarged portion 91 may be made integral with adaptor 40. Enlarged portion 91 has a hinge slot 57 cut into an outer surface 56 substantially at terminal end 79, one side of hinge slot 57 shown in the cross sectional view in FIG. 2. Hinge slot 57 extends inwardly from terminal end 79 a distance equal to at least the diameter of a rounded end 58 of hinge arm 69 and through enlarged portion 91 from outer surface 56 to inner surface 59. A hinge pin hole 48 is provided through enlarged portion 91 perpendicular to hinge slot 57, hinge pin hole 48 disposed outwardly from inner surface 59 at least the radius of rounded end 58. Thus, rounded end 58 of hinge arm 69 may rotate about a hinge pin 68 driven through hinge pin hole 48 of hinge slot 57 and hinge pin hole 89 of hinge arm 69 thereby providing a pivot for closure lid 61 of safety closure 60. Hinge pin hole 89 is disposed through rounded end 58 spaced from an outer periphery 83 of closure lid 61 such that closure side 62 of closure lid 61 opens at least tangent to an extension 90 of inside surface 49 of adaptor 40 whereby the velocity of liquid flowing from terminal end 79 is uninhibited by safety closure 60. Therefore, closure lid 61 swings away from sealing surface 45 at least ninety degrees providing for uninhibited flow of liquid from terminal end 79 and likewise, uninhibited flow from discharge end 51 of nozzle spout 27. As the velocity of liquid flowing from nozzle spout 27 is unrestricted, the partial vacuum created in narrow space 53 is also unrestricted by safety closure 60. In an alternate embodiment where closure lid 61 is biased against sealing surface 45 by a biasing spring disposed around hinge pin 68 and means for operating 70 comprises the force of fluid impinging upon closure side 62 of closure lid 61, the velocity of liquid flowing from nozzle spout 27 may be somewhat restricted, however, it has been found by the teachings of this invention, that such alternate means for operating 70 does not unduly restrict the flow of fluid and hence does not unduly restrict the amount of vacuum generated by the velocity of fluid flowing from discharge end 51. Hence, the operation of vacuum responsive means 25 is largely unaffected by the alternate embodiment of closure lid 61.

Closure lid 61 is preferably a round disc having hinge arm 69 protruding from outer periphery 83. As hereinbefore recited, closure lid 61 has closure side 62 with sealing gasket 64 or tapered sealing surface 65 disposed thereon and additionally has at least one attachment boss 66 disposed on closure side 62. Each attachment boss 66 is spaced inwardly from outer peripheral surface 83 on closure side 62 such that actuating rod 72, when attached to any attachment boss 66, is aligned with hinge arm 69. Each attachment boss 66 has rod pin slot 67 disposed from a point closest to closure side 62 and outer periphery 83 angling inwardly toward center 84 and upwardly from closure side 62 such that rod pin slot 67 may slidably accept rod pin 86 driven through actuating rod 72 at assembly of safety closure 60.

In FIG. 3, closure lid 61 is broken to show alternative closures for safety closure 60. As shown on the right hand broken away portion of closure lid 61, closure side 62 may be a flat sealing surface 88 adapted to sealingly mate with sealing surface 45 on terminal end 79 of enlarged portion 91 of adaptor 40 but may also have a gasket 64 carried therewith. Gasket 64 may be a flat gasket fitted into a recess disposed into closure side 62 of closure lid 61 and retained under a lip at the inner periphery 82 of gasket 64 or may be an O-ring fitted into an O-ring recess disposed into closure side 62 wherein the O-ring sealingly mates against a portion of sealing surface 45. As closure lid 61 is biased against sealing surface 45 by biasing spring 73, gasket 64 is also biased against sealing surface 45. Safety closure 60 is biased against a seat 46 disposed in sealing surface 45 wherein seat 46 may also comprise an O-ring groove for receiving the aforementioned O-ring or may be a smooth surface for accepting a flat gasket such as gasket 64 there against. Closure lid 61 may be greater in diameter than gasket 64 whereby a flat portion extends outwardly from gasket 64 to outer periphery 83 though closure lid 61 is usually the same diameter at outer periphery 83 as the diameter of terminal end 79 of adaptor 40.

Preferably, seat 46 in sealing surface 45 is tapered and safety closure 60 has a tapered sealing surface 65 disposed on a closure side 62 thereof as shown in the left hand broken away portion of closure lid 61. The angle of taper of seat 46 and corresponding tapered sealing surface 65 may be any suitable angle above a locking taper and preferably is at forty five degrees downwardly from the flat surface of closure side 62 and outwardly from a center 84, the taper ending at outer periphery 83 of closure lid 61. Closure lid 61 may alternately be greater in diameter than tapered sealing surface 65 whereby a flat portion extends outwardly from tapered sealing surface 65 to outer periphery 83. As closure lid 61 is biased against and closes adaptor 40 from terminal end 79, the weight of liquid bearing against closure lid 61 when container 30 is tipped enhances the sealing of sealing surfaces 45 and 88 or tapered sealing surfaces 46 and 65.

As adaptor 40 is threaded into and may be removed from fill pipe 31 as hereinafter described, an existing adaptor 40 may be retro-fitted with safety closure 60 and means for operating 70 by using an encircling sleeve 47 for mounting closure lid 61. When encircling sleeve 47 is employed, closure lid 61 is carried by encircling sleeve 47 as hinge arm 69 is hingedly retained in hinge slot 57 disposed in encircling sleeve 47 just as hinge arm 69 is hingedly retained in hinge slot 57 in enlarged end 91 of the preferred embodiment. By using encircling sleeve 47, an existing adaptor 40 may be fitted with safety closure 60 by sliding encircling sleeve 47 upon second end 42 abutting a shoulder 92 against terminal end 79 of adaptor 40 and retaining encircling sleeve 47 thereon by friction. Alternately, encircling sleeve 47 may be attached to second end 42 by welding encircling sleeve to terminal end 79 or by rivets (not shown) or by set screws (not shown) disposed through encircling sleeve 47 from outer surface 56 wherein the set screws engage outer peripheral surface 55 of second end 42 or where the rivets are driven into holes through encircling sleeve and second end 42 and peened thereinto. When retro-fitting an existing adaptor 40 with safety closure 60 and guide tube 71, guide tube 71 is affixed to inside surface 49 of second end 42 with set screws 98 disposed through a wall 93 of second end 42 and encircling sleeve 47 is pressed upon second end 42 while aligning guide tube 71 with attachment boss 66 and retained thereonto in a manner hereinbefore described. Actuating rod 72 is then fitted with biasing spring 73 and closure end 76 is passed through guide tube 71 compressing biasing spring 73 until closure end 76 protrudes from opposite end 78 of guide tube 71. Rod pin slot 67 in attachment boss 66 is aligned with rod pin hole 87 in actuating rod 72 and rod pin 86 is driven therethrough thereby rotatably affixing closure lid 61 to actuating rod 72. Rod pin 86 is frictionally engaged in rod pin hole 87 of actuating rod 72 and slidably received in rod pin slot 67 of attachment boss 66. Thus, as actuating rod 72 moves closure lid 61 to an open position, rod pin 86 slides along rod pin slot 67 inwardly and upwardly to open closure lid 61 such that closure side 62 is substantially tangent to extension 90 of inside surface 49.

Figure 4:
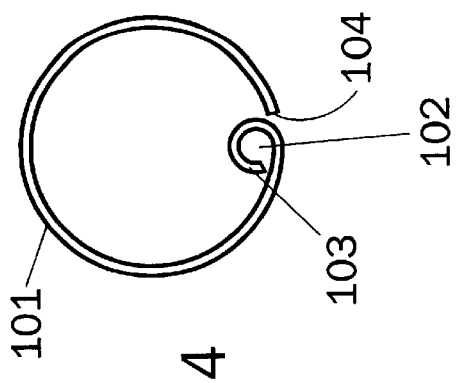
FIG. 4 is a plan view of an internal snap ring utilized as a rod guide in the filling adaptor of this invention.
Figure 6:
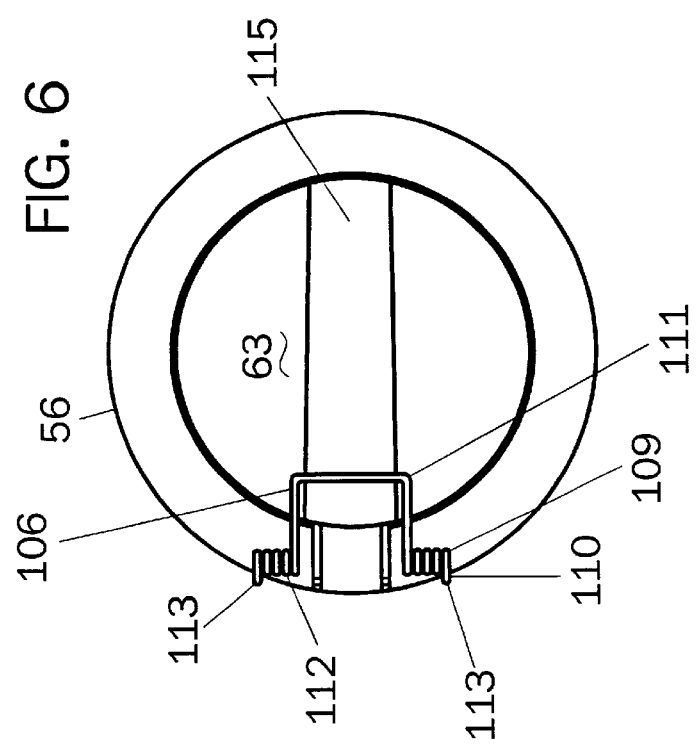
FIG. 6 is a end view of the terminal end of the enlarged end of the filling adaptor of FIG. 1 showing another alternate biasing spring.

In a another alternate embodiment, an internal snap ring 101, shown in FIG. 4, is disposed in a ring groove 99 near juncture 85, snap ring 101 having a loop 102 for receiving actuating rod 72 therein. In this embodiment, guide tube 71 is replaced by loop 102 of snap ring 101 as it is only sufficient to locate button 75 at a fixed distance from terminal end 79 such that button 75 may be contacted with discharge end 51 of nozzle spout 27 for actuation of safety closure 60 downstream from discharge end 51. Biasing spring 73 may be utilized with internal snap ring 101 in the same manner as described above for guide tube 71 above, one side 103 of loop 102 functioning as one end 77 of guide tube 71 in the preferred embodiment. Internal snap ring 101 is of sufficient thickness to bear the force of biasing spring 73 thereagainst without dislodging from ring groove 99 and is retained in location circumferentially by a set screw 98 disposed through wall 93 of second end 42 into ring groove 99 between the opposing ends 102, 104 of internal snap ring 101. When using internal snap ring 101, actuating rod 72 lies substantially parallel with inside surface 49 and is attached only at attachment boss 66 passing through loop 102 to retain nozzle end 74 at a given point adjacent juncture 85. Internal snap ring 101 may also be utilized with an alternate biasing of closure lid 61, closure lid 61 having a leaf spring 105 having one end 108 affixed to or bearing against a portion 115 of opposite side 63 and the other end 107 affixed to outside surface 56 or may have a torsion spring 106, of FIG. 6, disposed around hinge pin 68 and bearing against opposite side 63 and outside surface 56, either of alternate biasing springs 105, 106 biasing closure lid 61 against sealing surface 45. Where leaf spring 105 or torsion spring 106 is utilized to bias closure lid 61 against sealing surface 45, biasing spring 73 may be omitted, however, biasing spring 73 is usually used as biasing spring 73 firmly holds nozzle end 74 of actuating rod in a given position for easy contact with discharge end 51 of nozzle spout 27. Although only one ring groove 99 is usually provided near juncture 85, at least one other ring groove 99 may be provided downstream from juncture 85 with another internal snap ring 101 disposed therein, another internal snap ring 101 having loop 102 aligned with loop 102 of internal snap ring 101 near juncture 85 and with attachment boss 66 on closure lid 61.

In the preferred embodiment, enlarged portion 91 is made a part of second end 42 and hinge slot 57 is disposed in enlarged portion 91. Hinge arm 69 of closure lid 61 is placed into slot 57 aligning hinge pin hole 89 of hinge arm 69 with hinge pin hole 48 in enlarged portion 91. Hinge pin 68 is driven through holes 48, 89 thereby rotatably fixing closure lid 61 to enlarged portion 91. As above, actuating rod 72 is then fitted with biasing spring 73 and closure end 76 is passed through guide tube 71 compressing biasing spring 73 until closure end 76 protrudes from opposite end 78 of guide tube 71. Rod pin slot 67 in attachment boss 66 is aligned with rod pin hole 87 in actuating rod 72 and rod pin 86 is driven therethrough thereby slidably affixing closure lid 61 to actuating rod 72. Actuating rod 72 is then released allowing biasing spring 73 to close closure lid 61 against sealing surface 45 as biasing spring 73 forces button 75 away from nozzle end 77 of guide tube 71.

Safety closure 60 is actuated to an open position by discharge end 51 of nozzle spout 27 when nozzle spout 27 is fully inserted into adaptor 40 as discharge end 51 contacts button 75 before full engagement with adaptor 40 and forces button 75 of actuating rod 72 toward nozzle end 77 of guide tube 71 until quick release coupling 28 can be locked onto locking ring 15 of first end 41 of adaptor 40. As actuating rod 72 is moved toward nozzle end 77, biasing spring 73 has one end 80 compressed toward other end 81 and closure end 76 of actuating rod 72 moves away from opposite end 78 of guide tube 71 thus forcing closure lid 61 to rotate upon hinge pin 68 and move away from sealing surface 45. When nozzle spout 27 is fully inserted into adaptor 40 and locked thereonto, closure lid 61 has pivoted at least ninety degrees upon hinge pin 68 and closure side 62 of closure lid 61 is at least aligned with extension 90 of inside surface 49, however, guide slot 67 in attachment boss 66 may open closure lid 61 beyond ninety degrees. As is readily apparent from FIGS. 1 through 3, safety closure 60 is downstream of and actuated to the open position by means for operating 70, means for operating 70 disposed upstream and remote from safety closure 60 wherein means for operating 70 is actuated by discharge end 51 of nozzle spout 27. Thus, safety closure 60 is downstream from discharge end 51 of nozzle spout 27 and all liquid discharged from nozzle spout 27 will pass through safety closure 60 and drain into container 30 such that no liquid remains trapped in adaptor 40 upon removal of filling nozzle 20. A commercially available rollover valve (not shown) is disposed in inlet port 38 to prevent liquid from flowing from container 30 into adaptor 40 through vacuum tube 35 when container 30 is tipped. Such a commercial rollover valve allows venting of the headspace of container 30 when container 30 is in an substantially upright orientation, however, a sealing device moves toward and seals against a seat as the rollover valve tips with container 30.

After assembly of safety closure 60 and means for operating 70 to adaptor 40, installation in a fill pipe 31 of a container 30 to be filled may proceed. Fill pipe 31 is permanently affixed to a top wall 32 of container 30 and has an enlarged open end having an internal thread. Second end 42 of adaptor 40 having safety closure 60 associated therewith is inserted into fill pipe 31 such that a cooperating thread 54 of adaptor 40 is engaged with the internal thread of fill pipe 31. Adaptor 40 is screwed into the internal thread of fill pipe 31 until fully seated therein such that removal of cap 33 or quick release coupling 28 from open cap end 17 does not dislodge adaptor 40 from fill pipe 31. The orientation of safety closure 60 with respect to fill pipe 31 is not significant as safety closure 60 is constructed to be fully clear of the liquid stream emanating from second end 42 as closure lid 61 rotates upon hinge pin 68 at least ninety degrees. Upon seating of adaptor 40 into fill pipe 31, inlet port end 11 of vacuum tube 35 is affixed to an inlet port adaptor 38 disposed through top wall 32 of container 30 and chamber end 12 of vacuum tube 35 is affixed to a chamber fitting 34 disposed in first end 41 of adaptor 40, chamber fitting 34 having free communication with vacuum chamber 50. Vacuum chamber 50 between discharge end 51 of nozzle spout 27 and inside surface 52 of frusto-conical section 44 and first end 41 of adaptor 40 provides communication with vacuum passage 39 in nozzle 20 for operation of vacuum responsive means 25. The function of nozzle 20 disposed in adaptor 40 of filling system 10 is fully described in the aforementioned U.S. Pat. No. 4,441,533 to Snyder, et at., incorporated by this reference thereto.

Though the teachings of this invention may be utilized in any fill pipe 31 of any container 30 to be filled with liquid 100, the safety closure 60 of this invention is particularly suited to containers 30 which contain material which would cause irreparable harm to the environment when spilled from container 30. One such container 30 is the fuel tank of a rail borne locomotive commonly utilized to transport goods and personnel across a rail system. Such locomotives are subject to rocking back and forth while traveling on the rails which may cause some spillage of liquid 100 from container 30 during this motion, however, in derailments of such locomotives, spillage of fuel from fill pipe 31 is common as the locomotive is tipped from the rail bed upon derailment. It is not uncommon for fueling personnel to fail to replace cap 33 on adaptor 40 of the aforementioned U.S. Pat. No. 4,441,553 and therefore first end 41 of adaptor 40 has open cap end 17 exposed allowing for sloshing out of fuel during the aforementioned rocking motion and most assuredly during derailment of the locomotive. Even when cap 33 is replaced upon open cap end 17, cap 33 may become dislodged during a derailment thereby opening fill pipe 31 to the environment. It is readily apparent therefore, that safety closure 60 of this invention prevents spillage of fuel from a locomotive fuel tank which has been tipped when cap 33 has been removed or left off open cap end 17 as safety closure 60 is disposed well within and protected by fill pipe 31. As safety closure 60 is biased against terminal end 79 of adaptor 40 by biasing spring 73 with sealing surfaces 88 and 45 or seat 46 and tapered seat 65 of closure side 62 providing positive sealing of liquid 100 within container 30, spillage of liquid fuel from a locomotive tank is thus prevented. Furthermore, as the weight of the liquid 100 in container 30 would bear against opposite side 63 of closure lid 61 when container 30 is tipped, sealing of sealing surfaces 88 and 45 or seat 46 and tapered seat 65 of closure side 62 would be enhanced further adding to the safety features of safety closure 60. Finally, since means for operating 70 is disposed well within first end 41 and openable only by depressing button 75 with discharge end 51 of nozzle 20, inadvertent operation of safety closure 60 is effectively eliminated and the integrity of safety closure 60 is fully maintained.

As adaptor 40 may be removed from fill pipe 31, repair of safety closure 60 or means for operating 70 may be easily effected. For instance, adaptor 40 may be removed from fill pipe 31 by unscrewing cooperating thread 54 from the internal thread of fill pipe 31 and safety closure 60 uncoupled from actuating rod 72 by driving rod pin 86 out of engagement with rod pin hole 87 in actuating rod 72. Once actuating rod 71 is uncoupled from attachment boss 64, actuating rod 72 and biasing spring 73 may be removed from guide tube 71 through open cap end 17. Closure lid 61 may then be removed from enlarged end 91 by driving hinge pin 68 out of enlarged end 91 and hinge arm 69. Also, in an existing adaptor 40 which has been retro-fitted with safety closure 60 and means for operating 70, guide tube 71 may be removed from adaptor 40 by removing the attaching screws 98 provided through wall 93 on second end 42. Any part needing repair or replacement may be easily replaced in the same manner as original parts are assembled to adaptor 40.

Though adaptor 40 having safety closure 60 has been hereinbefore described as particularly suitable for installation in a fill pipe 31 of container 30 on a railroad locomotive by screwing adaptor 40 into an internal thread on fill pipe 31, adaptor 40 may have other alternate configurations for first end 41 for installation in other fill pipes 31 of other containers 30. For instance, first end 41 may have a smooth outer surface 94 without threads 54 disposed thereon where adaptor 40 may be force fit within a fill pipe 31 having a smooth round bore. A shoulder on first end 41 may be employed to register adaptor 40 with fill pipe 31 or an indentation may be made in fill pipe 31 to bear against an end 95 of first end 41 either to prevent adaptor 40 from extending too far into fill pipe 31. The other features of adaptor 40 will remain as hereinbefore described thereby providing a safety closure 60 disposed well within fill pipe 31 and operable by remote means for operation 70. Thus, adaptor 40 and safety closure 60 associated therewith may be utilized in the fill pipe 31 of an automobile replacing the pass through closure generally associated therewith, thus improving the safety of an automobile by having safety closure 60 significantly downstream from open cap end 17. Furthermore, since safety closure 60 provides a positive seal against adaptor 40, leakage generally occurring through the pass through closure of an automobile tank is fully eliminated. Although a filling nozzle 20 of an automobile fueling system is typically not firmly attached to fill pipe 31, manually holding nozzle 20 in contact with button 75 provides for operation of means for operating 70 and subsequent opening of safety closure 60.

In new castings of adaptor 40, adaptor 40 is typically formed by casting a hollow tube in the shape of adaptor 40 in either a sand casting or die casting operation, adaptor 40 having first end 41 and second end 42. Adaptor 40 has cooperating threads 54 formed on a portion of outer surface 94 of first end 41 by machining threads 54 into outer surface 94. Smooth surfaces for locking ring 15 and open cap end 17 are formed on first end 41 in an additional machining operation. Enlarged end 91 is formed on second end 42 at terminal end 79 of adaptor 40, enlarged end 91 receiving closure lid 61 therein. Hinge slot 57 is machined into enlarged end 91 at terminal end 79, hinge slot 57 formed at least equal to the width of hinge arm 69 of closure lid 61 and extends from inside surface 49 toward outer surface 56 a distance at least equal to the length of hinge arm 69 as measured from outer periphery 83 of closure lid 61 to rounded end 58 of hinge arm 69. Hinge pin hole 48 is drilled perpendicular to hinge slot 57 through outer surface 56 passing through hinge slot 57 and exiting outer surface 56 as enlarged end 91 is cylindrical in nature. The remainder of the surfaces of adaptor 40 remain as cast as the surface roughness of these surfaces is not critical. Of course, adaptor 40 may be formed by machining the complete adaptor 40 from a thick wall tubing or a solid bar of material, however, the waste associated therewith makes the machining operation cost prohibitive. A selected sealing surface 45 is formed on terminal end 79 of adaptor 40 by either casting or machining a tapered seat 65 into sealing surface 45 for receiving seat 46 of closure lid 61 or by machining terminal end 79 perpendicular to inside surface 49 to receive flat sealing surface 88.

At least one vacuum chamber port is formed through first end 41 from outside surface 94 to inside surface 96 for receiving chamber fitting 34 therein. Chamber fitting 34 and inlet adaptor 38 are generally formed from short lengths of pipe having threads on one end and a hose or tubing fitting on the opposite end, the threads of chamber fitting 34 being threaded into the one of the vacuum chamber ports in first end 41 and the threads of inlet adaptor 38 being threaded into top wall 32 of container 30. When adaptor 40 has been fully seated into fill pipe 31, chamber fitting 34 is threaded into the one of the vacuum chamber ports in first end 41 most directly in line with inlet adaptor 38 in top wall 32 of container 30. A commercially available length of flexible tubing is provided and is attached at inlet port end 11 to inlet adaptor 48 while chamber end 12 is secured to chamber fitting 34 thus establishing vacuum tube 35 of system 10.

In the preferred embodiment of casting adaptor 40, guide tube 71 is formed on inside surface 49 of second end 42 integral with second end 49, guide tube 71 extending from juncture 85 of frusto-conical section 44 and second end 42 substantially to terminal end 79 of second end 42. Guide tube 71 may be terminated short of terminal end 79 to allow for attachment boss 66 to fit with in terminal end 79 when closure lid 61 is fully seated against sealing surface 45.

Closure lid 61 is similarly sand cast or die cast of a suitable material having one of the selected sealing seats 65 or 88 formed on closure side 62. Closure lid 61 is formed substantially round having hinge arm 69 protruding from outer periphery 83 of closure lid 61. Hinge arm 69 is formed as a substantially rectangular tab and may be approximately the same thickness as closure lid 61. Hinge pin hole 89 is formed through hinge arm 69 by drilling a hole substantially the same size as hinge pin hole 89 through hinge arm 69. Typically, hinge pin hole 48 in enlarged end 91 is slightly larger in internal diameter that hinge pin 68 and hinge pin hole 89 is slightly smaller than hinge pin 68 such that hinge pin 68 is press fit into hinge pin hole 89 whereby closure lid 61 and hinge pin 68 rotate freely within hinge pin holes 48 drilled through enlarged end 91. Alternately, hinge pin hole 48 in enlarged end 91 may be slightly smaller than hinge pin 68 while hinge pin hole 89 is slightly larger than hinge pin 68 such that closure lid 61 rotates on hinge pin 68, hinge pin 68 firmly held in hinge pin holes 48. Where gasket 64 is utilized on sealing surface 88, gasket 64 is purchased from a commercial source and placed into contact with flat surface 88 sliding a portion of gasket 64 under a lip provided on closure side 62. Closure lid 61 has at least one, and preferably two, rectangular cubic attachment bosses 66 cast integrally with a closure side 62 adjacent outer periphery 83 on either side of hinge arm 69, a space 97 between attachment bosses 66 aligned with actuating rod 72 protruding from adaptor 40 when adaptor 40 has been fully assembled. Attachment bosses 66 have elongated slot 67 formed at an angle with respect to closure side 62, elongated slot 67 angled from a point nearest to hinge arm 69 and closure side 62 inwardly and upwardly away from closure side 62 as elongated slot 67 extends toward center 84. Elongated slot 67 is slightly larger in width than rod pin 86 such that rod pin 86 may slide freely along elongated slot 67 during opening and closing of closure lid 61. Adaptor 40 with guide tube 71 and closure lid 61 are generally die cast of aluminum alloy, however, ferrous alloys or zinc base alloys may be employed.

Actuating rod 72 is formed from a length of drill rod and has rod pin hole 87 drilled diametrically through closure end 76 substantially at closure end 76 such that rod pin 86 may be pressed thereinto at assembly of closure lid 61 to actuating rod 72. Thus, rod pin hole 87 is typically slightly smaller than rod pin 86 such that rod pin 86 may be frictionally retained in rod pin hole 87. Nozzle end 74 of actuating rod 72 has contact button 75 welded thereto, actuating rod 72 centered on contact button 75. Actuating rod 72 is typically three/thirty seconds diameter drill rod approximately one inch longer than guide tube 71 while contact button 75 is a one eighth inch thick flat disc of steel approximately three eighths inch in diameter. Biasing spring 73 may be formed from a length of spring wire wound tightly into a spiral having an internal diameter slightly greater than the outside diameter of actuating rod 72 and a free spring length of approximately one inch, however, biasing spring 73 is typically purchased from an industrial spring manufacturer having a spring constant sufficient to retain closure lid 61 against closure surface 45. The external diameter of biasing spring 73 is formed to be greater than the height and/or width of guide tube 71 and smaller in diameter than contact button 75 such that one end 80 of biasing spring 73 may bear against the side of contact button 75 welded to actuating rod 72 and the other end 81 may bear upon first end 77 of guide tube 71. Alternately, button 75 may be formed as a loop in nozzle end 74 of actuating rod 72 by turning a portion of a circle on nozzle end 74 and bending the circle to a plane perpendicular to nozzle end 74.

Hinge pin 68 is a commercially available solid roll pin selected to be frictionally retained in hinge pin holes 48 passing through hinge pin hole 89 in hinge 69. Rod pin 86 is also a commercially available roll pin such as a split roll pin such that rod pin 86 is frictionally engaged in rod pin hole 87 of actuating rod 72. Rod pin 86 must be of sufficient length to protrude from either side of actuating rod 72 such that the ends thereof may be slidably received in rod pin slots 67 in attachment bosses 66.

In the construction of an alternate embodiment of safety closure 60 of this invention, an encircling sleeve 47 is formed with an internal diameter of internal surface 59 substantially equal to an external diameter of outer surface 55 of adaptor 40, adaptor 40 having been previously formed by casting from an aluminum alloy, zinc based alloy or ferrous alloy. Encircling sleeve 47 may be cast from a material similar to that of adaptor 40 or encircling sleeve 47 may be machined from a solid bar or tube of material. Encircling sleeve 47 has a shoulder 92 formed on inside surface 59, shoulder 92 provided to abut against terminal end 79 of adaptor 40 when encircling sleeve is press fit upon terminal end 79 of adaptor 40. Hinge slot 57 is machined into encircling sleeve 47 from internal surface 59 and may extend through encircling sleeve 47 to outer surface 56. Typically, hinge slot 57 is at least the length of hinge arm 69. Hinge pin hole 48 is drilled through encircling sleeve 47 perpendicular to hinge slot 57 and passes through outer surface 56 parallel to a tangent to outer surface 56 at hinge slot 57. Closure lid 61 is identical to closure lid 61 previously described and affixes to hinge 68 in a similar manner.

In a first alternate embodiment of the rod guide, guide tube 71 is formed from a straight length of pipe having square ends 77 and 78. Guide tube 71 is attached to inside surface 49 of a previously formed adaptor 40 by socket head cap screws 98 drilled and tapped into guide tube 71. Cap screws 98 are disposed through wall 93 of adaptor 40 and fixedly retain guide tube 71 on inside surface 49 of adaptor 40. Actuating tube 72 with button 75 affixed thereto and spring 73 disposed therearound as previously described can then be inserted guide tube 71 and affixed to closure lid 61 in the manner described above for the preferred embodiment. These alternate embodiments described herein are provided for retro-fitting existing adaptors 40 currently in use or in the warehouse, however, adaptor 40 may be initially constructed with any one of these alternates.

In a second alternate embodiment of the aforementioned rod guide, an internal snap ring 101 is formed having loop 102 formed in one end thereof. Internal snap ring 101 is shown in FIG. 4 and is made from a length of spring wire which is formed into a circle with a smaller circle formed on one end thereof comprising loop 102. Loop 102 is typically just slightly larger than actuating rod 72 such that actuating rod 72 may slide freely therein but be restrained from moving about freely within second end 42. To locate internal snap ring 101 for use with means for operating 70, ring groove 99 is formed into inside surface 49 of second end 42 near juncture 85 for receiving snap ring 101 therein. Snap ring 101 has loop 102 formed integral with snap ring 101, loop 102 aligned with attachment boss 66 at assembly of safety closure 60 and retained in position by set screw 98 drilled and tapped through wall 93 into ring groove 99. Internal snap ring 101 is retained in ring groove 99 by expanding into ring groove 99 and being captured in ring groove 99 and restrained from rotating about ring groove 99 by set screw 98 threaded into ring groove 99 between loop 102 and a free end 104 of internal snap ring 101. Internal snap ring 101 has one face 103 facing toward open cap end 17 and as internal snap ring 101 is located near juncture 85, face 103 may receive biasing spring 73 thereagainst functioning in the same manner as one end 77 of guide tube 71.

Figure 5:
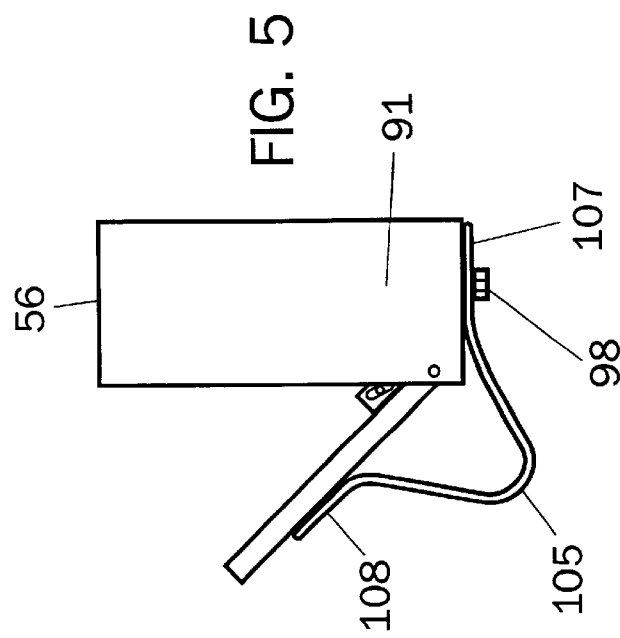
FIG. 5 is a side view of an enlarged end of the filling adaptor of FIG. 1 showing an alternate biasing spring.

One alternate biasing spring 73 comprises a leaf spring 105, shown in FIG. 5, formed from a length of flat spring material bent into an approximate "L" shape and affixing one end 107 to outside surface 56 while overlying a portion 115 of closure lid 61 with the opposite end 108. Another alternate biasing spring 73, shown in FIG. 6, comprises a double coil "U" shaped torsion spring 106 commonly utilized as the biasing spring for the clip portion of a hand held clip board. Such a spring is formed by turning a first coil 109 near one end 110 of a length of spring steel wire, forming a "U" shaped portion 111 adjacent first coil 109 and forming a second coil 112 adjacent "U" shaped portion 111. Alternate biasing spring 106 has "U" shaped portion 111 bearing upon a portion 115 of opposite surface 63 of closure lid 61 and has the legs 113 of spring 106 bearing against outside surface 56. Coils 109, 112 of spring 106 are disposed over extended ends 114 of hinge pin 68. Though springs 105, 106 are herein recited as alternates for biasing spring 73, any or all of alternate springs 105, 106 may be utilized with biasing spring 73 to provide closure force for closure lid 61.

According to the teachings of this invention, a safety closure 60 for a fill pipe adaptor 40 of a container 30 to be filled allows the safety closure 60 to be moved to an open position by means for operating 70 disposed remote from the safety closure 60 wherein means for operating 70 is actuated by discharge end 51 of filling nozzle 20 inserted into fill pipe adaptor 40. It is readily apparent that safety closure 60 is disposed well into and thereby protected by fill pipe 31 and as safety closure 60 is actuated only be contact of discharge end 51 of filling nozzle 20, inadvertent opening of safety closure 60 is prevented. Furthermore, it is also readily apparent that adaptor 40 and safety closure 60 are contained within fill pipe 31 and thus safety closure 60 is unaffected by movement of liquid 100 within container 30 providing another measure of safety to filling system 10.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. An adaptor for a fill pipe of a container to be filled, said fill pipe having an enlarged end for receiving said adaptor therein, said adaptor having a first end, a second end and a frusto-conical section between said first end and said second end, said container having a vacuum inlet port separate from said fill pipe, said vacuum inlet port connected to a vacuum chamber fitting adjacent said first end of said adaptor, said first end having a locking ring for removably locking a quick release coupling of an automated filling nozzle thereto, said filling nozzle having a vacuum responsive valve means therein, said frusto-conical section receiving a discharge end of said filling nozzle substantially contiguous with an inside surface thereof establishing a narrow space between said discharge end and said frusto-conical section such that the velocity of fluid being discharged from said discharge end of said nozzle creates a vacuum in said narrow space and said vacuum chamber, said vacuum actuating said vacuum responsive valve means to retain a manually actuated filling valve in said nozzle in an open position in the presence of vacuum in said vacuum chamber and closing said filling valve when the level of liquid in said container reaches said vacuum inlet port thereby increasing said vacuum to said vacuum responsive valve means, said second end of said adaptor having a safety closure integral therewith to reduce spillage of liquid from said container upon tipping of said container said safety closure moved to an open position by a means for operating disposed remote from said safety closure, said means for operating actuated by said discharge end of said filling nozzle when said filling nozzle is inserted into said fill pipe adaptor.

2. An adaptor as in claim 1 wherein said safety closure is retained in said open position by removably locking said quick release coupling of said nozzle to said first end of said adaptor.

3. An adaptor as in claim 1 wherein said means for operating comprises an actuating rod, a rod guide, a contact button, a biasing spring, at least one attachment boss and a rod pin, said rod pin rotatably affixed to a closure lid of said safety closure wherein when said discharge end of said nozzle is biased against said contact button, said contact button moves said actuating rod against the force of said biasing spring toward said closure lid.

4. An adaptor as in claim 3 wherein a hinge of said safety closure is integral with said second end, said hinge rotatably affixing said closure lid to said second end.

5. An adaptor as in claim 4 wherein said closure lid rotates about said hinge when said actuating rod is moved toward said closure lid.

6. An adaptor as in claim 5 wherein said closure lid is rotated substantially ninety degrees from a closure position to a fully open position when said quick release coupling of said nozzle is removably locked to said first end of said adaptor.

7. An adaptor as in claim 6 wherein said closure lid when rotated substantially ninety degrees from said closure position to said fully open position provides for uninhibited flow of liquid from said discharge end of said nozzle.

8. A safety closure for an adaptor for a fill pipe of a container to be filled, said fill pipe having an enlarged end for receiving said adaptor therein, said adaptor having a first end, a second end and a frusto-conical section between said first end and said second end, said container having a vacuum inlet port separate from said fill pipe, said vacuum inlet port connected to a vacuum chamber fitting adjacent said first end of said adaptor, said first end having a locking ring for removably locking a quick release coupling of an automated filling nozzle thereto, said filling nozzle having a vacuum responsive valve means therein, said frusto-conical section receiving a discharge end of said filling nozzle substantially contiguous with an inside surface thereof establishing a narrow space between said discharge end and said frusto-conical section such that the velocity of fluid being discharged from said discharge end of said nozzle creates a vacuum in said narrow space and said vacuum chamber, said vacuum actuating said vacuum responsive valve means to retain a manually actuated filling valve in said nozzle in an open position in the presence of vacuum in said vacuum chamber and closing said filling valve when the level of liquid in said container reaches said vacuum inlet port thereby increasing said vacuum to said vacuum responsive valve means, said safety closure comprising at least a portion of a separate sleeve removably affixed to an outer periphery of said second end, said safety closure adapted to reduce spillage of liquid from said container upon tipping of said container.

9. A safety closure as in claim 8 wherein a closure lid of said safety closure is moved to an open position by a means for operating disposed remote from said closure lid, said means for operating actuated by said discharge end of said filling nozzle when said filling nozzle is inserted into said fill pipe adaptor.

10. An safety closure as in claim 8 wherein said safety closure is affixed to said second end of an adaptor removed from an existing fuel tank fill pipe wherein said adaptor after having said safety closure affixed thereto is reinstalled in a fuel tank fill pipe.

11. An safety closure as in claim 10 wherein said safety closure comprises an encircling sleeve for mounting closure lid, said encircling sleeve frictionally engaged upon said second end of said adaptor.

12. An safety closure as in claim 11 wherein said encircling sleeve is attached to said adaptor by welding said encircling sleeve to a terminal end of said second end.

13. A fuel tank having a fill pipe for receiving the fuel to be contained in said fuel tank, said fill pipe having an enlarged end for receiving a filling adaptor therein, said adaptor having a first end, a second end and a frusto-conical section between said first end and said second end, said fuel tank having a vacuum inlet port separate from said fill pipe, said vacuum inlet port connected to a vacuum chamber fitting adjacent said first end of said adaptor, said first end having a locking ring for removably locking a quick release coupling of an automated filling nozzle thereto, said filling nozzle having a vacuum responsive valve means therein, said frusto-conical section receiving a discharge end of said filling nozzle substantially contiguous with an inside surface thereof establishing a narrow space between said discharge end and said frusto-conical section such that the velocity of fluid being discharged from said discharge end of said nozzle creates a vacuum in said narrow space and said vacuum chamber, said vacuum actuating said vacuum responsive valve means to retain a manually actuated filling valve in said nozzle in an open position in the presence of vacuum in said vacuum chamber and closing said filling valve when the level of liquid in said fuel tank reaches said vacuum inlet port thereby increasing said vacuum to said vacuum responsive valve means, said adaptor having a safety closure on said second end thereof, said safety closure comprising at least a portion of a separate sleeve removably affixed to an outer periphery of said second end, said safety closure having a closure lid adapted to sealingly retain said fuel in said fuel tank upon tipping of said fuel tank.

14. A fuel tank as in claim 13 wherein said safety closure is moved to an open position by a means for operating disposed remote from said safety closure, said means for operating actuated by said discharge end of said filling nozzle when said filling nozzle is inserted into said filling adaptor.

15. An adaptor as in claim 14 wherein said safety closure is retained in said open position by removably locking said quick release coupling of said nozzle to said first end of said adaptor.

16. An adaptor as in claim 14 wherein said means for operating comprises an actuating rod, a rod guide, a contact button, a biasing spring, at least one attachment boss and a rod pin, said rod pin rotatably affixed to a closure lid of said safety closure wherein when said discharge end of said nozzle is biased against said contact button, said contact button moves said actuating rod against the force of said biasing spring toward said closure lid.

17. An adaptor as in claim 16 wherein a hinge of said safety closure is integral with said second end, said hinge rotatably affixing said closure lid to said second end.

18. An adaptor as in claim 17 wherein said closure lid rotates about said hinge when said actuating rod is moved toward said closure lid.

19. An adaptor as in claim 18 wherein said closure lid is rotated at least ninety degrees from a closure position to a fully open position when said quick release coupling of said nozzle is removably locked to said first end of said adaptor.

20. An adaptor as in claim 19 wherein said closure lid when rotated substantially ninety degrees from said closure position to said fully open position provides for uninhibited flow of liquid from said discharge end of said nozzle.

* * * * *